June 26, 1928.
C. G. FISHER
1,674,966
ELECTRIC SWITCH ATTACHMENT
Filed Sept. 30, 1924
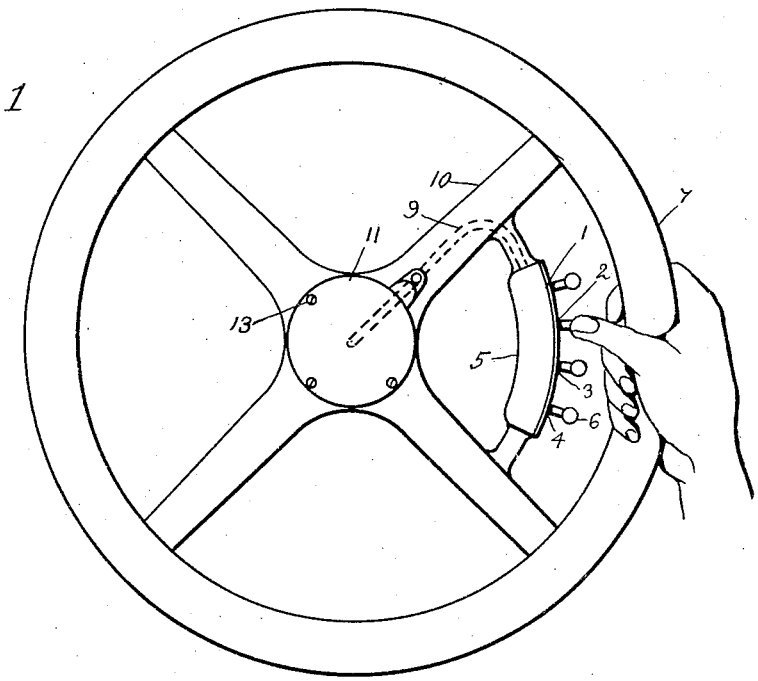
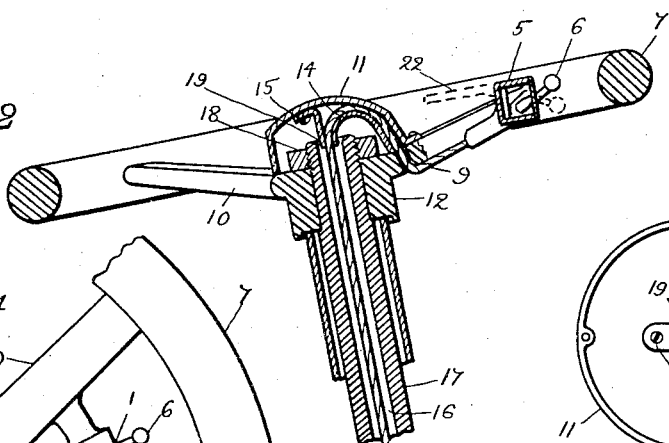
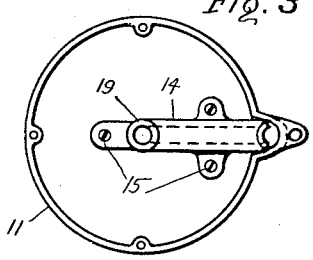
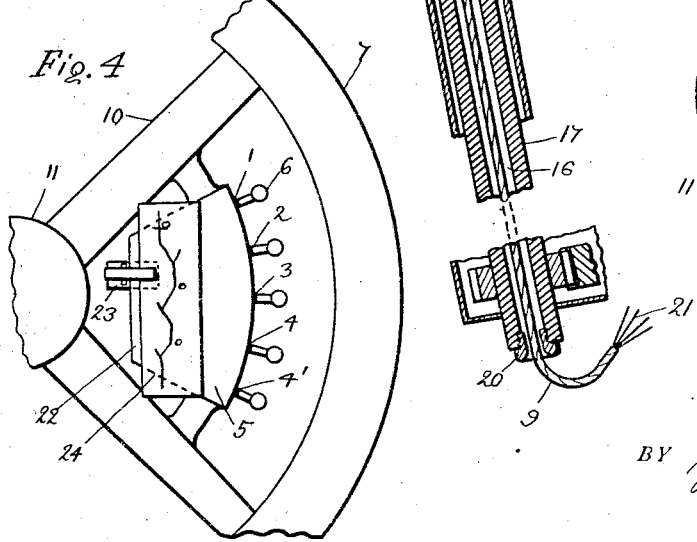
CARL G. FISHER
INVENTOR
BY John P. Nironow
ATTORNEY Patented June 26, 1928.

1,674,966

UNITED STATES PATENT OFFICE.

CARL G. FISHER, OF PORT WASHINGTON, NEW YORK.

ELECTRIC SWITCH ATTACHMENT.

Application filed September 30, 1924. Serial No. 740,778.

My invention relates to electric switch attachments and has a particular reference to switches controlling electric lights, ignition apparatus etc. on vehicles, such as automobiles and the like.

The object of my invention is to provide an electric switch mechanism mounted directly on the steering wheel of a vehicle within easy reach of the driver's fingers, so that he could operate these switches without losing his grip of the wheel.

I am aware that switches have been invented for mounting on top of the steering column, but such switches do not move with the steering wheel, and in order to operate them the driver must remove one hand from the wheel or to release his grip; while with my arrangement the driver can use both his hands for steering at all times, simply stretching out his thumb to operate any one of the switches wanted,—for instance, for dimming the headlights when passing another motorist, or pressing the electric horn button.

In order to maintain an uninterrupted electric connection between my switches and the rest of the electric equipment I provide an arrangement whereby the leads from the switches are brought through the hollow central portion of the steering column and allowing the straight portion of the cable to be twisted one way or the other during operation of the steering mechanism, this twisting being usually confined to narrow limits of about one turn either way. This arrangement is suitable for automobiles in which the control of the spark advance and of the throttle is placed outside of the steering column.

My invention is more fully described in the accompanying specification and drawing in which—

Fig. 1 is a plan view of a steering wheel with my switch, Fig. 2 is a sectional elevation of same, Fig. 3 is an inside view of the cable housing, and Fig. 4 is a plan view showing also an attachment for the road maps on the switch housing.

My switch mechanism consists of a plurality of individual switches 1, 2, 3 and 4, mounted in a switch housing 5 with the switch handles 6 extending outside. The housing is made in the form of an elongated box with its sides substantially concentric with the rim 7 of the steering wheel and attached to its spokes (or made integral with them).

The housing is placed at a convenient distance from the rim 7 so as not to interfere with the driver's hand. The switches may be of any construction, and switches of a "toggle" type are shown in Figs. 1 and 2 with their handles 6 extending radially so as to be within easy reach for the driver's thumb, while he firmly holds the wheel, as shown in Fig. 1.

The switches may be arranged so that with the handles in a raised position the circuits are open, and with the handles down,—closed, or vice versa. The down position of the handle is indicated in Fig. 2 with dotted lines.

One of the switches may be used to operate the electric horn circuit in which case it may be made with a retrieving spring which tends to hold it in an open position, the circuit being closed only while the driver's thumb is pressing on the handle.

One side of each switch may be grounded, according to usual practice on automobiles on which one side of the battery is grounded on the chassis frame.

One of the switches may be used, for instance, to operate the headlights, the other for dimmed or side lights and for the tail light, one for the ignition circuit etc.

The leads from the switches are twisted in a cable 9 and are brought under one of the spokes 10 of the wheel under a cable housing 11 attached to the wheel hub 12 with screws 13.

A guide bracket 14 is attached to the inside of the housing 11 with screws 15. This bracket forms a substantially semicircular guide in the housing for the cable 9 so as to bring the cable into a hollow central portion 16 of a steering column 17 to the upper end of which the steering wheel is attached with a nut 18. The guide bracket 14 is provided with a round tubular extension 19 partly fitting inside of the tubular central aperture 16.

The lower end of the cable is passed through a bushing 20 with rounded edges so as to prevent any chafing of the lower extension of the cable 9. The individual leads 21 of the cable are brought further to be connected with leads from different electrical apparatus controlled by the switches 1, 2, 3 and 4.

The straight portion of the cable inside of the steering post is wound loosely so that it can be twisted one way or the other to the extent required by the turning of the steering wheel. On ordinary automobiles it takes about one turn of the wheel either way from its middle position (with both wheels pointing straight ahead), and it is easy to provide a cable sufficiently flexible for this purpose.

This arrangement, of course, is especially practical with such steering wheels which do not have any control levers for spark and throttle, when automatic or foot operated devices are used, or when the control is placed in the instrument board.

The switch housing 5 may have an extension plate 22 with a spring clamp 23 for road maps, schedules, etc. (indicated with a numeral 24 in Fig. 4). Or the map supporting plate may be formed on some other part of my mechanism, for instance, on top of the cable housing 11.

Important advantages of my switch mounting is that the switches can be easily operated by the driver's thumb without releasing his grip of the wheel. This is very important from the safety point of view, the driver retaining full control of the wheel with both hands while dimming his headlights in passing another motorist or when using his electric horn to warn people and other vehicles on the road.

I claim as my invention:

1. In an electric switch attachment, the combination with a flexible insulated cable of a guiding member for said cable, a cap supporting said guiding member and attached to the upper central portion of a steering wheel, a switch on said steering wheel, said cable extending from said switch under said cap and through said guiding member in the hollow central passage in a post of said steering wheel, the lower portion of said guiding member extending into said hollow central passage and means to guide the lower end of said cable in said post.

2. In an electric switch attachment, the combination with a flexible insulated cable of a guiding member for said cable, a cap supporting said member and attached to the upper central portion of a steering wheel, and a switch on said steering wheel, said cable extending from said switch under said cap and extending further with the lower portion of said guiding member into the tubular central aperture in a post of said steering wheel.

3. In an electric switch attachment, the combination with a flexible insulated cable of a guiding member for the upper portion of said cable, means to support said guiding member on a steering wheel, a switch on said steering wheel, said cable extending from said switch through said guiding member into the tubular central aperture in a post of said steering wheel, the lower portion of said guiding member extending into said tubular aperture.

Signed at Port Washington, in the county of Nassau and State of New York, this 22 day of Sept., A. D. 1924.

CARL G. FISHER.